United States Patent
Eifert

(10) Patent No.: US 11,228,040 B2
(45) Date of Patent: Jan. 18, 2022

(54) GAS DISTRIBUTOR PLATE FOR A FUEL CELL AND/OR ELECTROLYZER

(71) Applicant: Robert Bosch GmbH, Stuttgart (DE)

(72) Inventor: Alexander Eifert, Friolzheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 311 days.

(21) Appl. No.: 16/475,222

(22) PCT Filed: Dec. 19, 2017

(86) PCT No.: PCT/EP2017/083545
§ 371 (c)(1),
(2) Date: Jul. 1, 2019

(87) PCT Pub. No.: WO2018/122040
PCT Pub. Date: Jul. 5, 2018

(65) Prior Publication Data
US 2019/0341627 A1    Nov. 7, 2019

(30) Foreign Application Priority Data
Dec. 29, 2016    (DE) .................... 10 2016 226 328.5

(51) Int. Cl.
*H01M 8/0206*    (2016.01)
*H01M 8/0221*    (2016.01)
(Continued)

(52) U.S. Cl.
CPC ....... *H01M 8/0206* (2013.01); *H01M 8/0221* (2013.01); *H01M 8/0228* (2013.01);
(Continued)

(58) Field of Classification Search
CPC ....... H01M 2008/1095; H01M 8/0206; H01M 8/0221; H01M 8/0228; H01M 8/0254;
(Continued)

(56) References Cited

U.S. PATENT DOCUMENTS

| | | | |
|---|---|---|---|
| 2003/0157391 A1* | 8/2003 | Coleman | H01M 8/0232 429/465 |
| 2011/0183228 A1 | 7/2011 | Shirvanian | |
| 2014/0147762 A1 | 5/2014 | Maass et al. | |

FOREIGN PATENT DOCUMENTS

| | | |
|---|---|---|
| CN | 103247807 | 7/2015 |
| DE | 102007025828 | 12/2008 |

(Continued)

OTHER PUBLICATIONS

International Search Report for Application No. PCT/EP2017/083545 dated Feb. 9, 2018 (English Translation, 3 pages).

*Primary Examiner* — Victoria H Lynch
(74) *Attorney, Agent, or Firm* — Michael Best & Friedrich LLP

(57) ABSTRACT

The invention relates to a gas distributor plate for a fuel cell, comprising a first distribution structure for distributing a fuel to a first electrode and a second distribution structure (60) for distributing an oxidation agent to a second electrode. According to the invention, there is at least one wire element (80) in at least one of the distribution structures (60). The invention further relates to a fuel cell, which comprises at least one membrane electrode unit having a first electrode and a second electrode, which are separated from each other by a membrane, and at least one gas distribution plate according to the invention.

12 Claims, 5 Drawing Sheets

(51) Int. Cl.
*H01M 8/0228* (2016.01)
*H01M 8/0254* (2016.01)
*H01M 8/0258* (2016.01)
*H01M 8/0267* (2016.01)
*H01M 8/241* (2016.01)
*H01M 8/2465* (2016.01)
*H01M 8/1018* (2016.01)

(52) U.S. Cl.
CPC ....... *H01M 8/0254* (2013.01); *H01M 8/0258* (2013.01); *H01M 8/0267* (2013.01); *H01M 8/241* (2013.01); *H01M 8/2465* (2013.01); *H01M 2008/1095* (2013.01)

(58) Field of Classification Search
CPC .. H01M 8/0258; H01M 8/0267; H01M 8/241; H01M 8/2465; Y02E 60/50
See application file for complete search history.

(56) References Cited

FOREIGN PATENT DOCUMENTS

| | | | |
|---|---|---|---|
| DE | 102012221730 | 5/2014 | |
| DE | 102014207594 | 10/2015 | |
| KR | 100820519 | 5/2008 | |
| WO | WO-02069424 A1 * | 9/2002 | ........ H01M 8/04074 |

* cited by examiner

GAS DISTRIBUTOR PLATE FOR A FUEL CELL AND/OR ELECTROLYZER

BACKGROUND OF THE INVENTION

The invention relates to a gas distributor plate for a fuel cell, comprising a first distribution structure for distribution of a fuel to a first electrode and a second distribution structure for distribution of an oxidant to a second electrode. The invention also relates to a fuel cell comprising at least one gas distributor plate of the invention.

A fuel cell is a galvanic cell that converts the chemical reaction energy from a continuously supplied fuel and an oxidant to electrical energy. A fuel cell is thus an electrochemical energy transducer. In known fuel cells, in particular, hydrogen (H2) and oxygen (O2) are converted to water (H2O), electrical energy and heat.

An electrolyzer is an electrochemical energy transducer that splits water (H2O) by means of electrical energy into hydrogen (H2) and oxygen (O2).

The known fuel cells include proton exchange membrane (PEM) fuel cells. Proton exchange membrane fuel cells have a membrane disposed in the center that is permeable to protons, i.e. to hydrogen ions. The oxidant, especially atmospheric oxygen, is thus spatially separated from the fuel, especially hydrogen.

Proton exchange membrane fuel cells also have an anode and a cathode. The fuel is supplied to the anode of the fuel cell and oxidized catalytically to protons with release of electrons. The protons pass through the membrane to the cathode. The electrons released are led off from the fuel cell and flow via an external circuit to the cathode.

The oxidant is supplied to the cathode of the fuel cell and it reacts by accepting the electrons from the external circuit and protons that pass through the membrane to the cathode to give water. The resultant water is led off from the fuel cell. The overall reaction is:

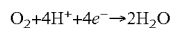

$$O_2 + 4H^+ + 4e^- \rightarrow 2H_2O$$

There is a voltage between the anode and cathode of the fuel cell. To increase the voltage, it is possible to arrange multiple fuel cells in mechanical succession to give a fuel cell stack and connect them electrically in series.

For homogeneous distribution of the fuel to the anode and for homogeneous distribution of the oxidant to the cathode, gas distributor plates are provided, which are also referred to as bipolar plates. The gas distributor plates have, for example, conduit structures for distribution of the fuel and the oxidant to the electrodes. The conduit structures also serve to lead off the water formed in the reaction. The gas distributor plates may also have structures for passage of a cooling liquid through the fuel cell to lead off heat.

DE 10 2012 221 730 A1 discloses a fuel cell having a generic gas distributor plate constructed from two plate halves. Each of these two plate halves has a distribution structure intended for distribution of the reaction gases.

DE 10 2014 207 594 A1 also discloses a gas distributor plate for a fuel cell. This gas distributor plate has a meandering conduit in the form of a groove for example. The meandering conduit serves to introduce hydrogen or oxygen into the fuel cell.

SUMMARY OF THE INVENTION

A gas distributor plate for a fuel cell is proposed, comprising a first distribution structure for distribution of a fuel to a first electrode and a second distribution structure for distribution of an oxidant to a second electrode. The gas distributor plate may alternatively be used in other electrochemical energy transducers, for example in an electrolyzer.

According to the invention, at least one wire element is provided in this distribution structure. By suitable arrangement of the wire element, it is possible to specifically form conduits in the distribution structure. This can affect the flow through the distribution structure.

Preferably, the at least one wire element is provided in the second distribution structure, which serves to distribute the oxidant to the second electrode and to lead off water formed in the reaction. At least one wire element may also, alternatively or additionally, be provided in the first distribution structure for distribution of a fuel to the first electrode.

In an advantageous configuration of the invention, the wire element has a round, i.e. circular, cross section. As a result, the wire element is comparatively inexpensive and easy to manufacture. But other cross-sectional shapes of the wire element are also conceivable. For example, the wire element may also have an oval, triangular, tetragonal, pentagonal, hexagonal or polygonal cross section.

Preferably, the wire element is manufactured from a metallic material. The wire element is thus electrically conductive and can conduct the electrons released in the electrochemical reaction in the fuel cell. Examples of possible materials for the wire element include corrosion-resistant materials such as copper, aluminum, silver, gold and stainless steel. But other, preferably electrically conductive, materials such as graphite or simple steel are also conceivable.

In an advantageous development of the invention, the wire element has a nanostructured and/or microstructured surface. The nanostructured and/or microstructured surface affects the wetting of the wire elements with water. Thus, the wire elements may take on either hydrophilic or hydrophobic properties. Depending on the desired process conditions, this can improve or slow the removal of water. The nanostructuring or microstructuring can be effected by different standard methods, and this can be effected at the early stage of production of the wire elements. Examples include the following methods: electrochemical (for example electrochemical deposition of three-dimensional copper structures or metal structures), plasma etching, CVD, PVD, mechanical roughening, lithography, laser-based methods (for example structuring of metallic materials with femtosecond laser pulses).

For protection of the wire element from corrosion, especially when the wire element is manufactured from a base metal, for example steel, the wire element can advantageously be provided with a sheath. The sheath especially contains a plastic, or a polymer. In order to ensure electrical conductivity for the electrons released in the electrochemical reaction in the fuel cell in spite of the electrically insulating sheath of the wire element, some contact sites on the wire element with adjacent conductive elements have been freed of the sheath. In addition, the protective sheath may be selected such that its electrical conductivity meets the requirements.

Advantageously, the distribution structure is bounded by a separation plate cohesively bonded to the wire element. The separation plate takes the form, for example, of a thin metallic sheet and separates the distribution structure, for example, from an adjacent distribution structure. Methods of bonding of the wire element to the separation plate include methods such as diffusion joining, welding, laser welding, resistance welding, soldering, hard soldering, soft soldering or sintering.

In an advantageous development of the invention, the wire element and the separation plate have been provided with a common coating. The coating especially contains a plastic, or a polymer. In the manufacture of the gas distributor plate, the wire element is first bonded to the separation plate and then the coating is applied. The coating especially serves to protect the wire element and the separation plate from corrosion, especially when the wire element and the separation plate have been manufactured from a base metal, for example steel.

In an advantageous configuration of the invention, the wire element has at least one inflection. By appropriate arrangement of the wire element with suitable inflections, it is possible to form conduits with varying widths within the distribution structure. This results in pressure differentials in the distribution structure as the oxidant flows through it and hence also in varying flow rates. This improves the mixing within the distribution structure.

In an advantageous development of the invention, at least two wire elements that run in mutually inclined directions are provided in the distribution structure. For example, the wire elements are layered one on top of another and run at right angles to one another. Such an arrangement of two or more wire elements can create porosity in the distribution structure.

Also proposed is a fuel cell comprising at least one membrane electrode unit having a first electrode and a second electrode that are separated from one another by a membrane, and comprising at least one gas distributor plate of the invention. More particularly, the fuel cell has such a construction that one gas distributor plate adjoins each side of the membrane electrode unit.

The inventive configuration of the gas distributor plate enables a flexible configuration of the distribution structure. The wire element can be placed in a wide variety of different layouts and hence form conduits with a wide variety of different geometries. The wire element may be manufactured from a wide variety of different materials. The wire element may have been covered, coated, ensheathed, or embedded coaxially in different materials. In the case of an arrangement of multiple wire elements one on top of another, it is also possible to produce porous structures in the gas distributor plate. By appropriate variation of the geometry of the conduits or of the wire element, it is possible to control gas flow, and also water outflow and water condensation. More particularly, findings that are obtained in appropriate simulations can be implemented comparatively rapidly and easily for practical testing.

By appropriate processing of the surfaces of the wire element, it is possible to influence the wetting properties of the wire element among other properties. In addition, it is possible to establish hydrophobic properties of the distribution structure by means of the ensheathing of the wire element. It is also conceivable, in the manufacture of the fuel cell or of a fuel cell stack with multiple fuel cells, to hold the wire element in a force-fitting manner within the wire structure by application of pressure. It is possible here to dispense with additional bonding, for example by welding.

BRIEF DESCRIPTION OF THE DRAWINGS

Embodiments of the invention are elucidated in detail by the drawings and the description which follows.

The figures show.

DETAILED DESCRIPTION

Figure 1:
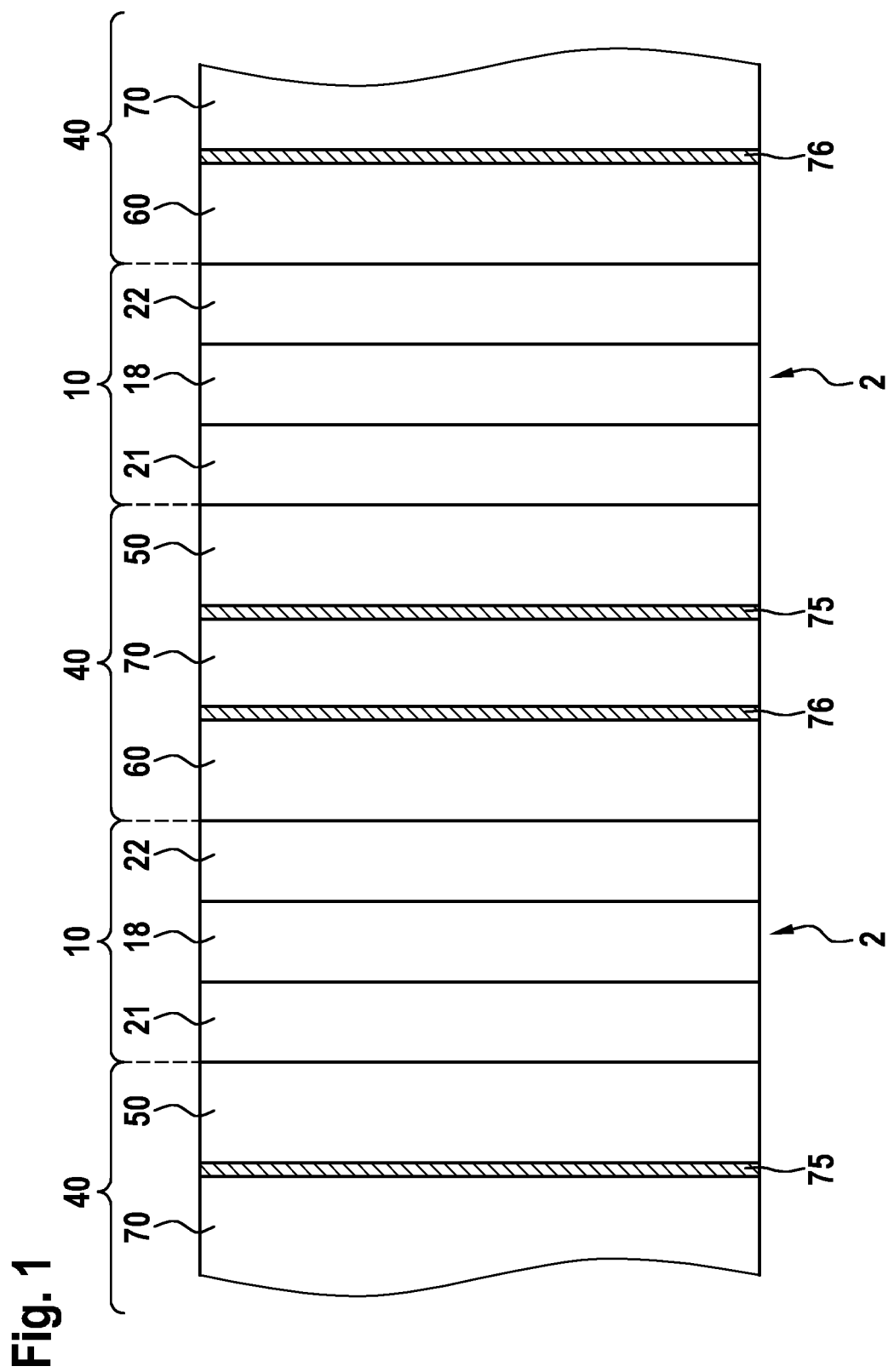
FIG. 1 a schematic diagram of a fuel cell stack with multiple fuel cells.

In the description of the embodiments of the invention that follows, identical or similar elements are identified by the same reference numerals, dispensing with repeated description of these elements in individual cases. The figures represent the subject matter of the invention merely in schematic form.

FIG. 1 shows a schematic diagram of a fuel cell stack with multiple fuel cells 2. Each fuel cell 2 has a membrane electrode unit 10 comprising a first electrode 21, a second electrode 22 and a membrane 18. The two electrodes 21, 22 are arranged on mutually opposite sides of the membrane 18 and are thus separated from one another by the membrane 18. The first electrode 21 is also referred to hereinafter as anode 21, and the second electrode 22 is also referred to hereinafter as cathode 22. The membrane 18 takes the form of a polymer electrolyte membrane. The membrane 18 is permeable to hydrogen ions, i.e. $H^+$ ions.

Each fuel cell 2 also has two gas distributor plates 40 that adjoin the membrane electrode unit 10 on either side. In the arrangement of multiple fuel cells 2 shown here in a fuel cell stack, each of the gas distributor plates 40 may be regarded as belonging to two fuel cells 2 in a mutually adjacent arrangement.

The gas distributor plates 40 each comprise a first distribution structure 50 for distribution of a fuel, which faces the anode 21. The gas distributor plates 40 each also comprise a second distribution structure 60 for distribution of the oxidant, which faces the cathode 22. The second distribution structure 60 serves simultaneously to lead off water formed in a reaction in the fuel cell 2.

The gas distributor plates 40 also comprise a third distribution structure 70 arranged between the first distribution structure 50 and the second distribution structure 60. The third distribution structure 70 serves to pass a coolant through the gas distributor plate 40 and hence to cool the fuel cell 2.

The first distribution structure 50 and the third distribution structure 70 are separated from one another by a first separation plate 75. The second distribution structure 60 and the third distribution structure 70 are separated from one another by a second separation plate 76. The separation plates 75, 76 of the gas distributor plates 40 in the present context take the form of thin metallic sheets.

In the operation of the fuel cell 2, fuel is guided to the anode 21 via the first distribution structure 50. Oxidant is likewise guided to the cathode 22 via the second distribution structure 60. The fuel, hydrogen in the present case, is catalytically oxidized to protons at the anode 21 with release of electrons. The protons pass through the membrane 18 to the cathode 22. The electrons released are led off from the fuel cell 2 and flow through an external circuit to the cathode 22. The oxidant, atmospheric oxygen in the present context, reacts by accepting the electrons from the external circuit and protons that have passed through the membrane 18 to the cathode 22 to give water.

Figure 2:
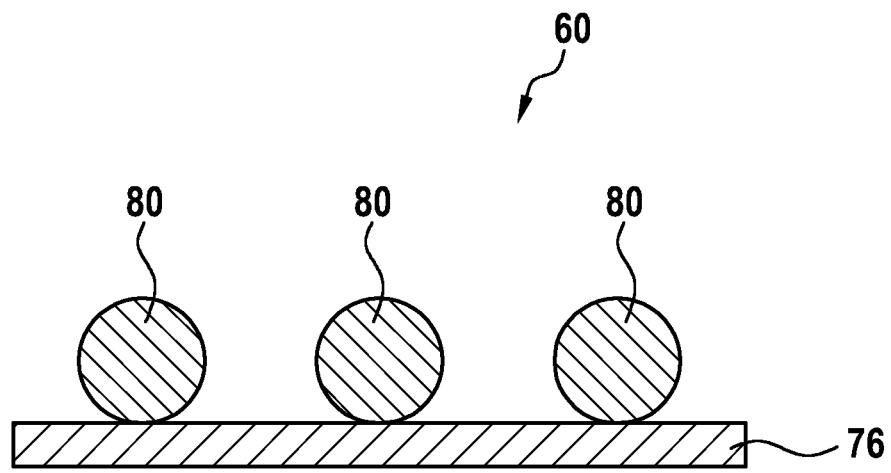
FIG. 2 a distribution structure of a gas distributor plate in a first embodiment, FIG. 3 a distribution structure of a gas distributor plate in a second embodiment, FIG. 4 a distribution structure of a gas distributor plate in a third embodiment, FIG. 5 a distribution structure of a gas distributor plate in a fourth embodiment, FIG. 6 a distribution structure of a gas distributor plate in a fifth embodiment and FIG. 7 a distribution structure of a gas distributor plate in a sixth embodiment.

FIG. 2 shows a second distribution structure 60 of a gas distributor plate 40 in a first embodiment. In the second distribution structure 60 bounded by a second separation plate 76, multiple wire elements 80, three in the present context, are provided.

The wire elements 80 in the present context have a round cross section. The wire elements 80 are manufactured from a metal, aluminum in the present context. These wire elements 80 are cohesively bonded to the second separation plate 76.

Figure 3:
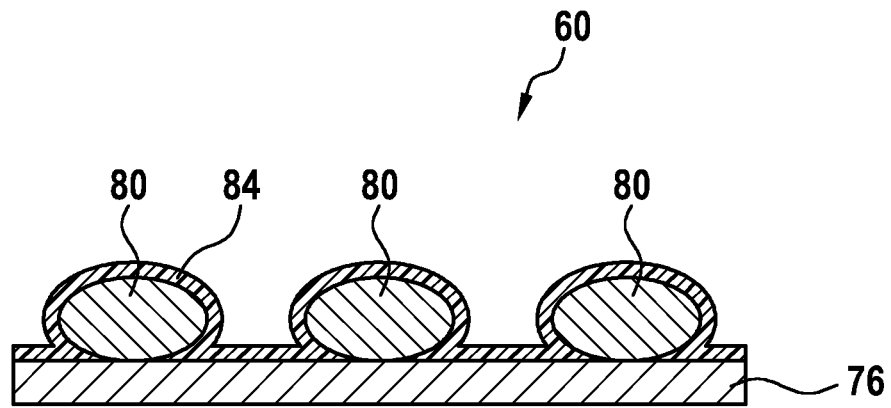

FIG. 3 shows a second distribution structure 60 of a gas distributor plate 40 in a second embodiment. In the second distribution structure 60 bounded by a second separation plate 76, multiple wire elements 80, three in the present context, are provided.

The wire elements 80 in the present context have an oval cross section. The wire elements 80 are manufactured from a metal, steel in the present context. These wire elements 80 are cohesively bonded to the second separation plate 76. The wire elements 80 and the second separation plate 76 have been provided with a common coating 84. The coating 84 contains a polymer and serves to protect the wire elements 80 and the second separation plate 76 from corrosion.

Figure 4:
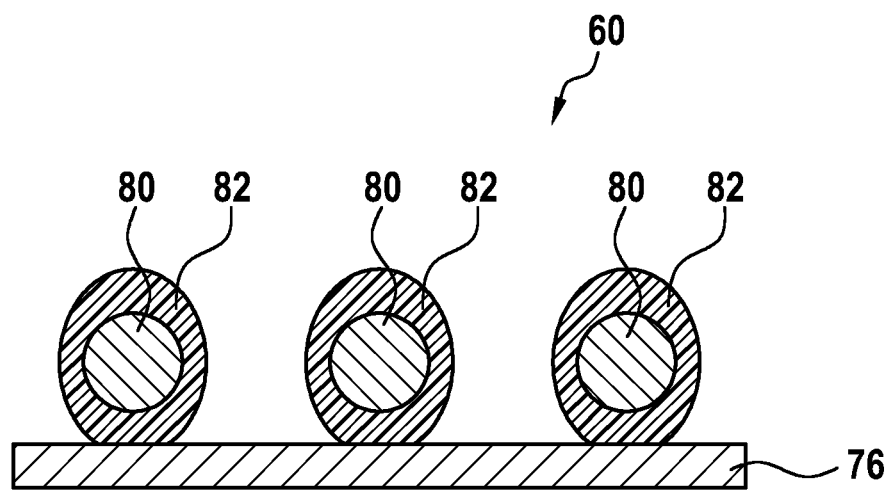

FIG. 4 shows a second distribution structure 60 of a gas distributor plate 40 in a third embodiment. In the second distribution structure 60 bounded by a second separation plate 76, multiple wire elements 80, three in the present context, are provided.

The wire elements 80 in the present context have a round cross section. The wire elements 80 are manufactured from a metal, steel in the present context. These wire elements 80 are each provided with a sheath 82. The sheath 82 contains a polymer and serves to protect the wire elements 80 from corrosion. The wire elements 80 have contact sites that are not visible here and are free of the sheath 82. At the contact sites, the wire elements 80 are cohesively bonded to the second separation plate 76.

Figure 5:
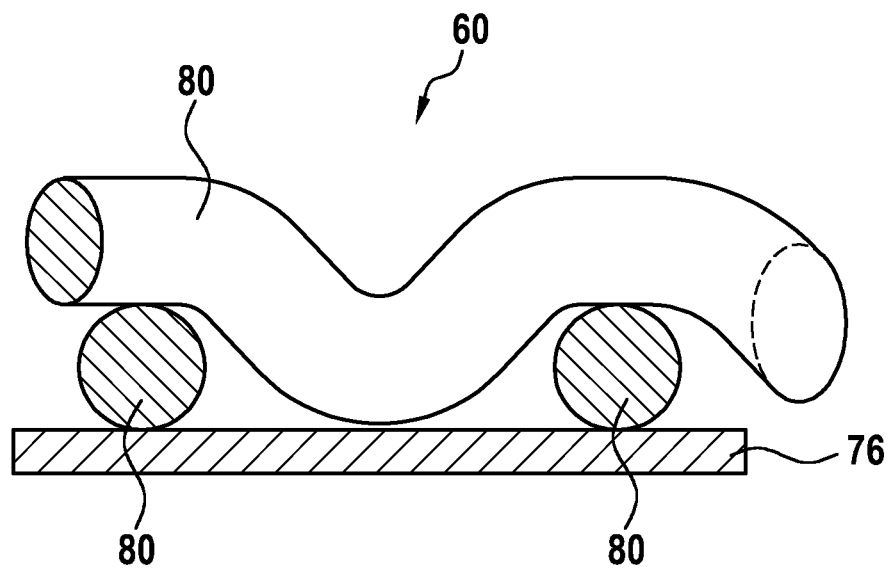

FIG. 5 shows a second distribution structure 60 of a gas distributor plate 40 in a fourth embodiment. In the second distribution structure 60, which is bounded by a second separation plate 76, multiple wire elements 80 are provided, with three wire elements 80 visible in the diagram shown.

In this case, two wire elements 80 that lie directly atop the second separation plate 76 run parallel to one another. Further wire elements 80 lie atop the two wire elements 80, which lie directly atop the second separation plate 76, and run at right angles thereto. The wire elements 80 that lie atop the other wire elements 80 are curved and approach one another in interstices between the other wire elements 80 of the second separation plate 76.

Figure 6:
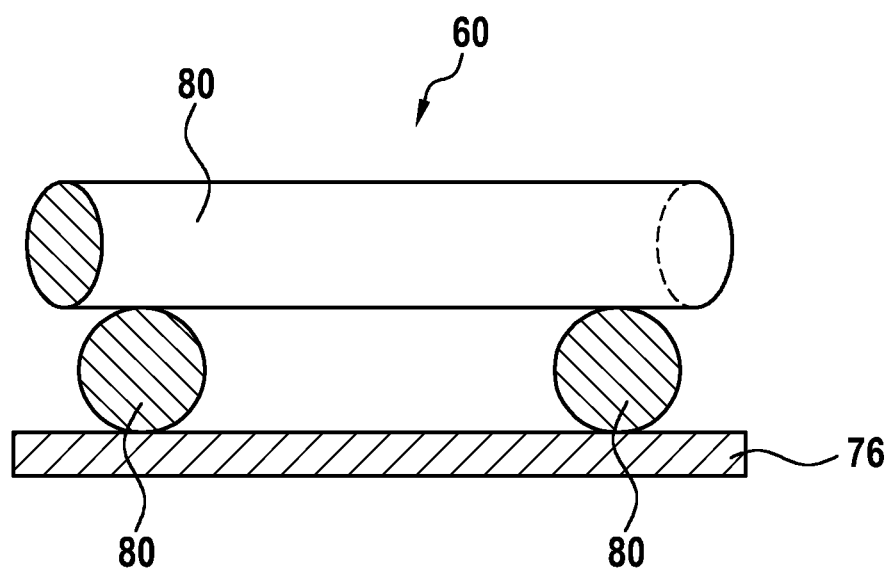

FIG. 6 shows a second distribution structure 60 of a gas distributor plate 40 in a fifth embodiment. In the second distribution structure 60, which is bounded by a second separation plate 76, multiple wire elements 80 are provided, with three wire elements 80 visible in the diagram shown.

In this case, two wire elements 80 that lie directly atop the second separation plate 76 run parallel to one another. Further wire elements 80 lie atop the two wire elements 80, which lie directly atop the second separation plate 76, and run at right angles thereto. In the present case, the wire elements 80 that lie atop the other wire elements 80 run straight and parallel to one another. The wire elements 80 that lie atop the other wire elements 80 thus have an equal distance from the second separation plate 76.

Figure 7:
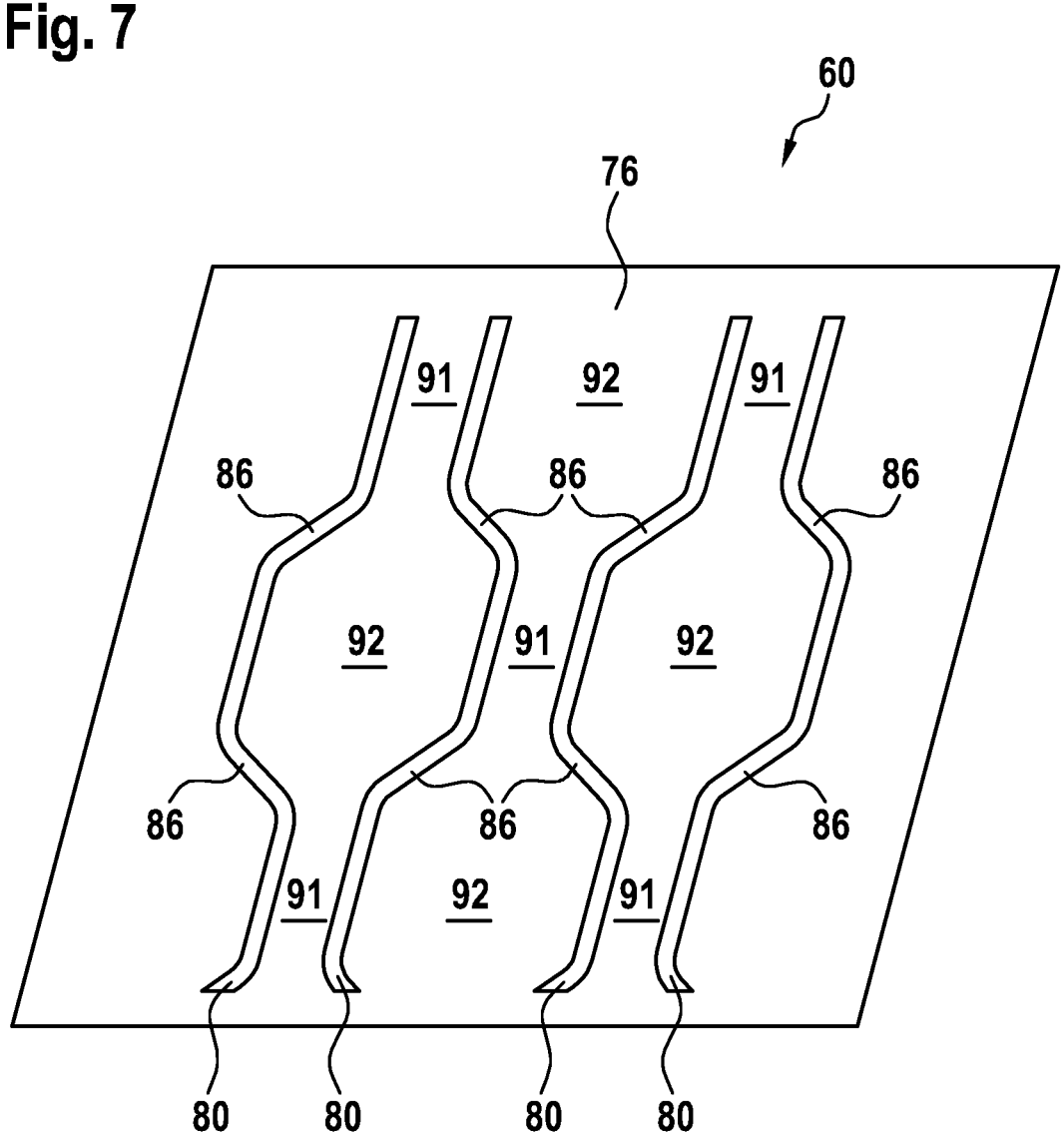

FIG. 7 shows a second distribution structure 60 of a gas distributor plate 40 in a sixth embodiment. In the second distribution structure 60, which is bounded by a second separation plate 76, multiple wire elements 80, four in the present context, are provided.

The wire elements 80 have inflections 86. The wire elements 80 thus run parallel to one another only in sections. The arrangement of the wire elements 80 shown here with said inflections 86 forms conduits with varying widths between the wire elements 80 within the second distribution structure 69.

This gives rise to first flow regions 91 having a comparatively small width. Also formed are second flow regions 92 having a greater width compared to the first flow regions 91.

In the operation of the fuel cell 2, when the oxidant flows through the second distribution structure 60, the oxidant in the first flow regions 91 has a higher flow rate than in the second flow regions 92. In addition, the oxidant in the first flow regions 91 has a lower pressure than in the second flow regions 92.

The invention is not limited to the working examples described here and the aspects emphasized therein. Instead, a multitude of modifications that are within the routine activity of the person skilled in the art is possible within the scope specified by the claims.

What is claimed is:

1. A gas distributor plate (40) for a fuel cell (2) and/or electrolyzer, the gas distributor plate comprising
   a first distribution structure (50) for distribution of a fuel to a first electrode (21),
   a second distribution structure (60) for distribution of an oxidant to a second electrode (22), and
   at least two wire elements (80) in the second distribution structure (60),
   wherein channels (91, 92) are formed between the at least two wire elements (80), the channels (91, 92) having varying widths resulting from inflections (86) in the at least two wire elements (80).

2. The gas distributor plate (40) as claimed in claim 1, characterized in that the at least two wire elements (80) have a round cross section.

3. The gas distributor plate (40) as claimed in claim 1, characterized in that the at least two wire elements (80) are made of a metallic material.

4. The gas distributor plate (40) as claimed in claim 1, characterized in that the at least two wire elements (80) have a nanostructured and/or microstructured surface.

5. The gas distributor plate (40) as claimed in claim 1, characterized in that the at least two wire elements (80) have a sheath (82).

6. The gas distributor plate (40) as claimed in claim 1, characterized in that the second distribution structure (60) is bounded by a separation plate (75, 76) cohesively bonded to the at least two wire elements (80).

7. The gas distributor plate (40) as claimed in claim 6, characterized in that the at least two wire elements (80) and the separation plate (75, 76) are provided with a common coating (84).

8. A fuel cell (2) comprising at least one gas distributor plate (40) as claimed in claim 1, the fuel cell (2) further comprising
   at least one membrane electrode unit (10) having the first electrode (21) and the second electrode (22) that are separated from one another by a membrane (18).

9. The gas distributor plate (40) as claimed in claim 1, characterized in that the at least two wire elements (80) have a nanostructured surface.

10. The gas distributor plate (40) as claimed in claim 1, characterized in that the at least two wire elements (80) have a microstructured surface.

11. The gas distributor plate (40) as claimed in claim 1, wherein the first distribution structure includes at least two other wire elements (80), characterized in that each of the distribution structures (50, 60) is bounded by a respective separation plate (75, 76), wherein each respective separation plate (75, 76) is cohesively bonded to the at least two wire elements (80) or the at least two other wire elements (80).

12. The gas distributor plate (40) as claimed in claim 1, characterized in the second distribution structure (60) is bounded by a separation plate (75, 76) directly bonded to the at least two wire elements (80).

* * * * *